US009488280B2

(12) United States Patent
Critchley

(10) Patent No.: US 9,488,280 B2
(45) Date of Patent: Nov. 8, 2016

(54) SEAL ASSEMBLY

(71) Applicant: ERIKS INDUSTRIAL SERVICES LIMITED, West Midlands (GB)

(72) Inventor: Andrew Critchley, Lancashire (GB)

(73) Assignee: Eriks Industrial Services Limited, West Midlands (GB)

( * ) Notice: Subject to any disclaimer, the term of this patent is extended or adjusted under 35 U.S.C. 154(b) by 0 days.

(21) Appl. No.: 14/639,417

(22) Filed: Mar. 5, 2015

(65) Prior Publication Data

US 2015/0252902 A1  Sep. 10, 2015

(30) Foreign Application Priority Data

Mar. 5, 2014  (GB) .................. 1403898.8

(51) Int. Cl.
F16J 15/38 (2006.01)
F16J 15/34 (2006.01)

(52) U.S. Cl.
CPC ........... F16J 15/3404 (2013.01); F16J 15/344 (2013.01)

(58) Field of Classification Search
CPC ................................ F16J 15/344; F16J 15/38
See application file for complete search history.

(56) References Cited

U.S. PATENT DOCUMENTS

| 2,908,521 | A | | 10/1959 | Kangas | |
|---|---|---|---|---|---|
| 3,180,648 | A | | 4/1965 | Kupfert et al. | |
| 3,322,431 | A | * | 5/1967 | Solari | F16J 15/344 |
| | | | | | 277/380 |
| 3,527,465 | A | * | 9/1970 | Guinard | F04C 15/0038 |
| | | | | | 277/400 |
| 3,985,366 | A | * | 10/1976 | Plouzek | F16J 15/344 |
| | | | | | 277/367 |
| 4,077,634 | A | * | 3/1978 | Durham | F16J 15/344 |
| | | | | | 277/382 |
| 4,087,100 | A | * | 5/1978 | Yoshihashi | F16J 15/3416 |
| | | | | | 277/382 |
| 4,176,848 | A | | 12/1979 | Lafuze | |
| 4,844,483 | A | * | 7/1989 | Iijima | F16J 15/162 |
| | | | | | 277/382 |
| 5,577,739 | A | | 11/1996 | Ciotola | |
| 5,899,459 | A | | 5/1999 | Watts | |
| 6,550,778 | B1 | * | 4/2003 | Zutz | F16J 15/344 |
| | | | | | 277/358 |
| 2011/0048810 | A1 | * | 3/2011 | Lin | E21B 10/25 |
| | | | | | 175/371 |
| 2012/0248706 | A1 | * | 10/2012 | Hoppe | F16J 15/344 |
| | | | | | 277/399 |
| 2013/0209295 | A1 | | 8/2013 | Ramos | |

(Continued)

FOREIGN PATENT DOCUMENTS

| CN | 202468992 U | 10/2012 |
|---|---|---|
| DE | 2849323 A1 | 5/1980 |
| EP | 2859950 A1 | 4/2015 |

(Continued)

OTHER PUBLICATIONS

Extended Search Report issued by EPO for corresponding European Patent Application No. 15157657.6 dated Jul. 30, 2015.

(Continued)

Primary Examiner — Gilbert Lee
(74) Attorney, Agent, or Firm — Ronald E. Prass, Jr.; Prass LLP

(57) ABSTRACT

A seal assembly comprises a first ring and a second ring which are rotatable relative to each other about a longitudinal axis (A-A). A first annular seal surface is formed on the first ring and is inclined with respect to the longitudinal axis and a second annular seal surface is formed on the second ring and is complementarily inclined to, and in abutment with, said first annular seal surface on the first ring. An annular groove is formed in at least one of said first and second seal rings adjacent to the seal surface on said seal ring and preferably a portion of the other ring projects into, or to a location adjacent to, the annular groove.

13 Claims, 6 Drawing Sheets

(56) References Cited

U.S. PATENT DOCUMENTS

2013/0285332 A1 10/2013 Bishop
2014/0175753 A1* 6/2014 Antoine ............... F16J 15/344
                                                          277/358

FOREIGN PATENT DOCUMENTS

| GB | 1176695 A | 1/1970 |
| GB | 2177465 A | 1/1987 |
| JP | 2013210072 A | 10/2013 |
| WO | 2005121615 A1 | 12/2005 |
| WO | 2013147079 A1 | 10/2013 |

OTHER PUBLICATIONS

Search Report issued by UKIPO for corresponding UK Patent Application No. 1503669.2 on Sep. 8, 2015.
Search Report for UK Patent Application No. 14 03898.8 dated Sep. 17, 2014.

* cited by examiner

SEAL ASSEMBLY

This application claims priority under 37 C.F.R. §119(a)-(d) to United Kingdom Patent Application No. 14 03898.8, filed Mar. 5, 2014, the disclosure of which is hereby incorporated by reference herein in its entirety.

BACKGROUND OF THE INVENTION

The present invention relates to seal assemblies and in particular, but not exclusively, to metal face seal assemblies.

Metal face assemblies are used in a number of applications, for example in the oil and gas industry where they are operated in highly destructive or abrasive environments. Metal face seal assemblies often provide a seal between relatively rotating components, protecting against solid and liquid contaminants as well as providing leak proof retention of lubricants. Typically, they comprise a pair of confronting face seal rings of metal or other durable material. The seal rings rotate relative to one another in face-to-face contact to provide a positive face seal which retains lubricant and prevents foreign matter from reaching the internal sealing cavity.

However, current metal face seal assembly designs are known to have limitations. In particular, the seal rings are known to be in contact only across a small proportion of the full seal face. The narrow contact area between the seal faces leads to higher contact pressures, which in turn leads to the premature wear of the surface alongside local heating and degradation of lubricant.

This also prevents lubrication across the whole seal face. As seen in U.S. Pat. No. 3,180,648, a lack of lubrication can lead to metal on metal running, which in turn increases operating temperatures across the sealing interface. Such functioning can reduce the lifetime of the seal assembly and allow contaminants to work between the seal faces.

Uneven distribution of lubricant can also result from radial movement of the seal rings perpendicular to the axis of rotation. Radial movement can lead to overlapping of the transitional regions allowing lubricant to escape via a "pumping" action. Similar failure modes may result from variation in lapped band and mating surface waviness.

In addition, the removal of protective oxide layers on the contacting surfaces can further lead to the mechanical seal failure. The presence of oxygen in lubricant oil can lead to the formation of oxide layers on the seal faces. These protective oxide layers provide a defence against mechanical wear by asperity contacts and delay the exposure of the metal seal faces. The oxide formation and removal rates are highly dependent on temperature. Above some critical temperatures, the oxide removal rate will exceed the oxide formation rate and so will lead to further exposure of the metal seal faces.

Thus sealing rings may fail due to excessive friction, radial movement and temperature rise accompanied with damage to the sealing interface.

It is an object of the present invention to overcome or alleviate these known problems.

BRIEF SUMMARY OF THE INVENTION

In accordance with a first aspect of the present invention, a seal assembly comprises a first ring and a second ring which are rotatable relative to each other about a longitudinal axis; a first annular seal surface formed on the first ring, said first annular seal surface being inclined with respect to the longitudinal axis; a second annular seal surface formed on the second ring, said second annular seal surface being complementarily inclined and in abutment with said first annular seal surface; and an annular groove formed in at least one of said first and second seal rings adjacent to the seal surface on said seal ring.

By providing complementarily inclined sealing surfaces, the seal rings become self-centring. The sealing faces radially constrain one another, significantly reducing the propensity of the sealing faces to run on a narrow transitional region. This in turn reduces the contact pressure on the running surfaces and prevents pumping of oil past the seal surfaces. The correspondingly inclined sealing surfaces provide a longer path, reducing the propensity for external contaminants to enter the internal sealing cavity. A further benefit of the inclined sealing surfaces is that it reduces the overall stiffness of the seal rings. This in turn allows the sealing surfaces to conform more readily, increasing resistance to shock loading and vibration and allows the sealing surfaces to run at a broader range of setting gaps. Such a feature is important when the seal assembly is required to function in both lubricating oils and greases. This flexibility is not achievable with known assembly designs which incorporate perpendicular sealing faces, as all of the force generated from the compression of the toric seal (or other means) is in the single axial direction.

In addition, the incorporation of an annular groove compensates for a high level of stiffness. Stiffness in a sealing face brings minimum distortion caused by pressure gradients, thermal gradients and rotational driving forces. Low stiffness brings conformability to the inclined sealing faces which is a desirable property for seal face materials. Lack of stiffness in the assembly can be compensated for in the design of the metal support system for the seal face by incorporating an annular recess groove positioned beneath the seal surface allowing it to flex.

Further, where irregularities exist in the contact surface of seal faces, the annular recess groove allows the seal surface to flex creating optimal contact across the seal faces.

Additionally, the annular recess groove allows for compensation of face load in the event of uneven fitting or application conditions such as those that may occur where the seal rings are tilted in the assembly or where the toric becomes twisted. Both result in uneven face loads circumferentially around the sealing faces and this can cause the seal rings to wither and separate, allowing oil to flow outward, or gall from localised high face load. The annular recess groove mitigates this by allowing the seal surfaces to flex, compensating for uneven or excessive face load.

Preferably, one or both of the first and second rings comprises a seal-receiving recess on an outer surface.

It is preferred that the first dynamic and/or second, static ring includes at least one radially outwardly extending annular shoulder formed on the outer surface.

Preferably the first, dynamic and second, static rings include a seal, and preferably the seal is resiliently deformable.

Preferably, the seal biases the first, dynamic and second, static rings in a direction towards each other in sealing abutment with the annular sealing surface on the first and second rings.

It is preferred that the outer surface of the first and second ring comprise a frusto-conical portion, with the inner surface of the rings being cylindrical.

In a further embodiment, the first and/or second ring comprise a plurality of annular grooves.

Preferably, the annular groove has a cylindrical cross-section, with a lubricant disposed within the groove to provide lubrication between the first annular seal surface and the second annular seal surface.

It is preferred that the first and/or second ring comprise a projection which projects into, or adjacent to the annular groove of the corresponding ring.

In a further embodiment, the cross sectional length of the first and second annular seal surfaces are different. Preferably, the different cross-sectional length and/or geometry afforded by the annular seal surfaces allows projection into said groove.

BRIEF DESCRIPTION OF THE DRAWINGS

By way of example only, a specific embodiment of the present invention will now be described with reference to the accompanying drawings in which.

DETAILED DESCRIPTION

Figure 1:
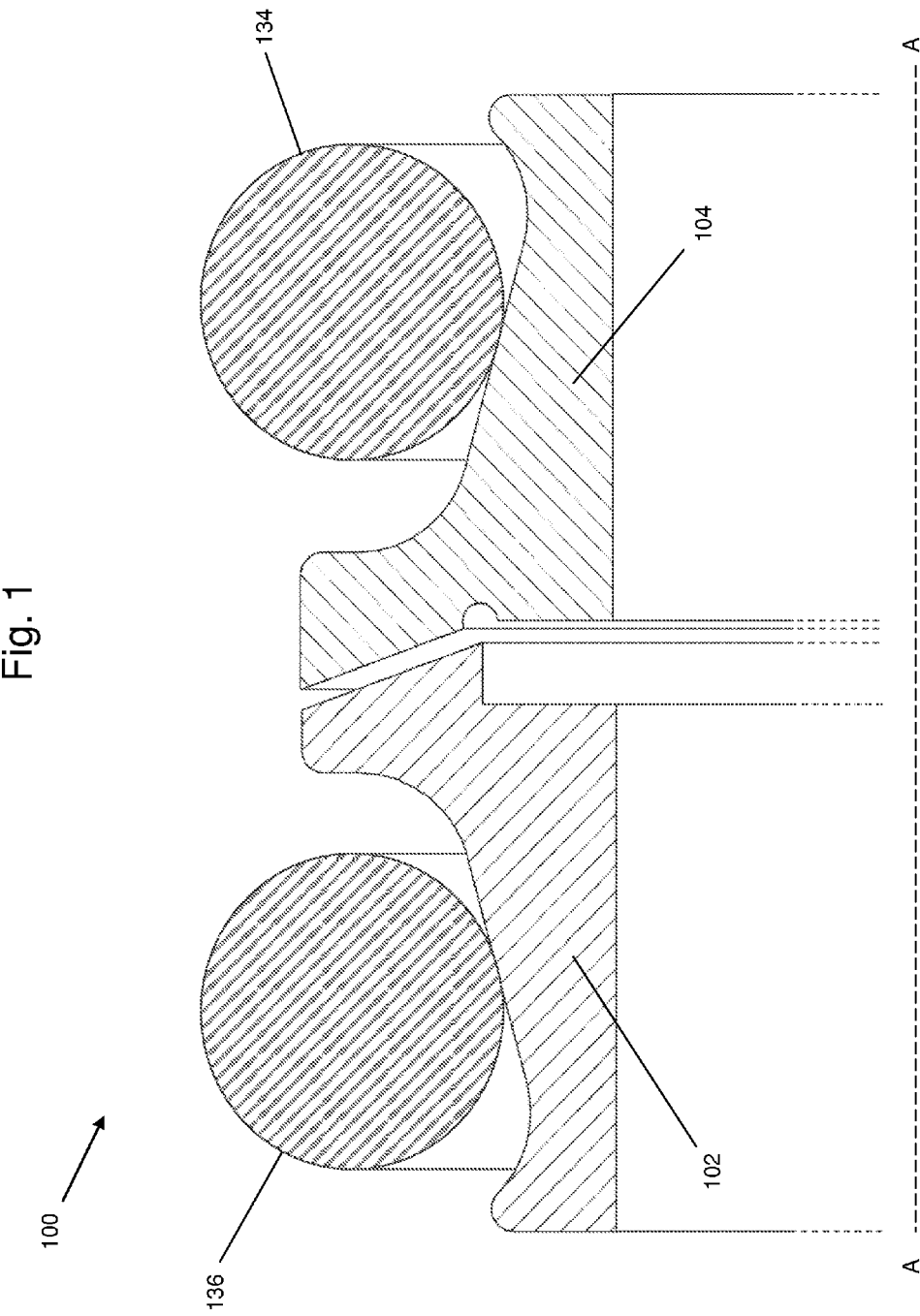
FIG. 1 is a cross-sectional view of a first embodiment of a seal assembly in accordance with the present invention.

With reference to FIG. 1, there is shown a cross-sectional view through part of a seal assembly 100. Seal assembly 100 includes a first circular seal ring 102 and a second circular seal ring 104. The first, dynamic seal ring 102 is rotatable relative to the second, static seal ring 104, rotating about the longitudinal axis A-A, corresponding to the centre of each of the rings 102, 104. The two seal rings 102, 104 face each other and provide means for fluidly sealing between components that are rotating relative to one another.

Figure 2:
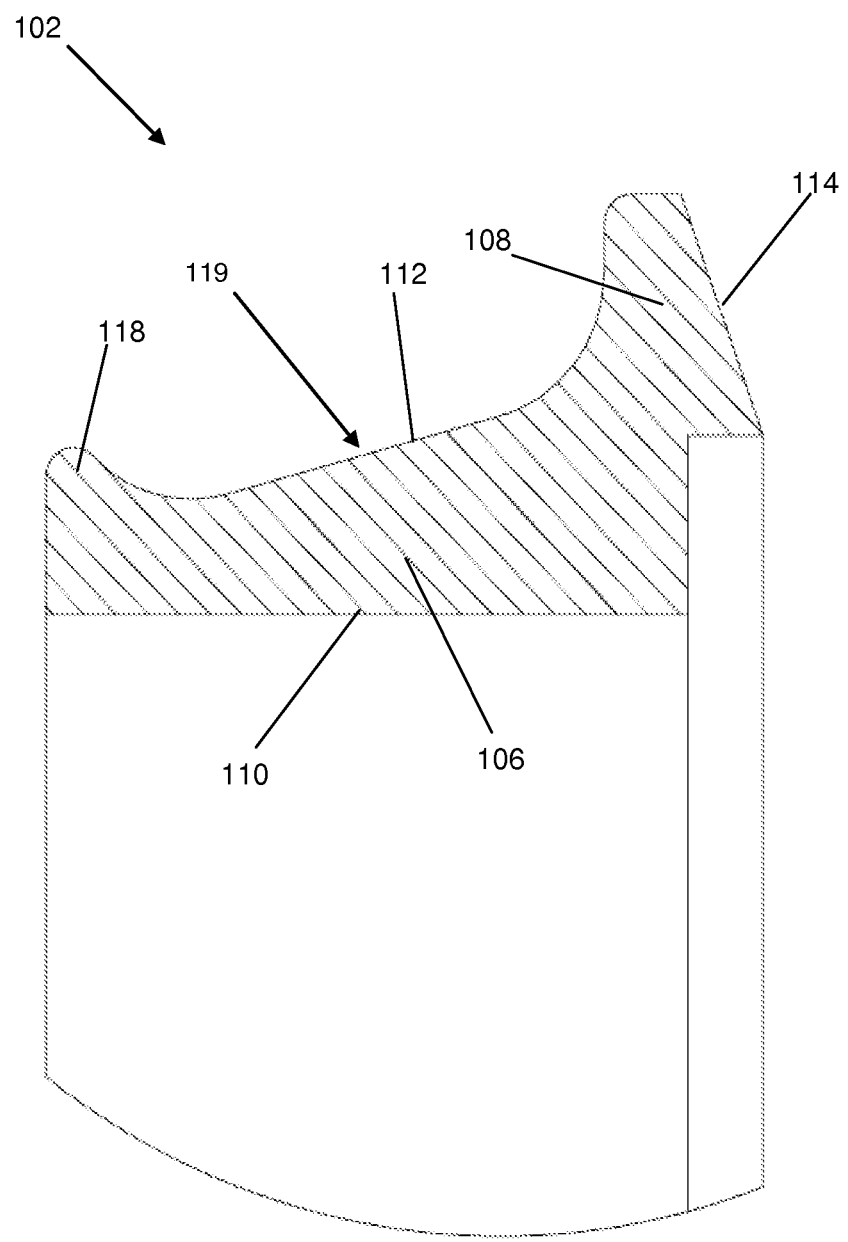
FIG. 2 is a cross-sectional view of a dynamic seal ring which forms part of the seal assembly of FIG. 1.

As seen in FIG. 2, the first seal ring 102 has a central tubular body portion 106 and an annular shoulder 108 projecting both axially and radially from a first end of the tubular body portion 106.

Figure 4:
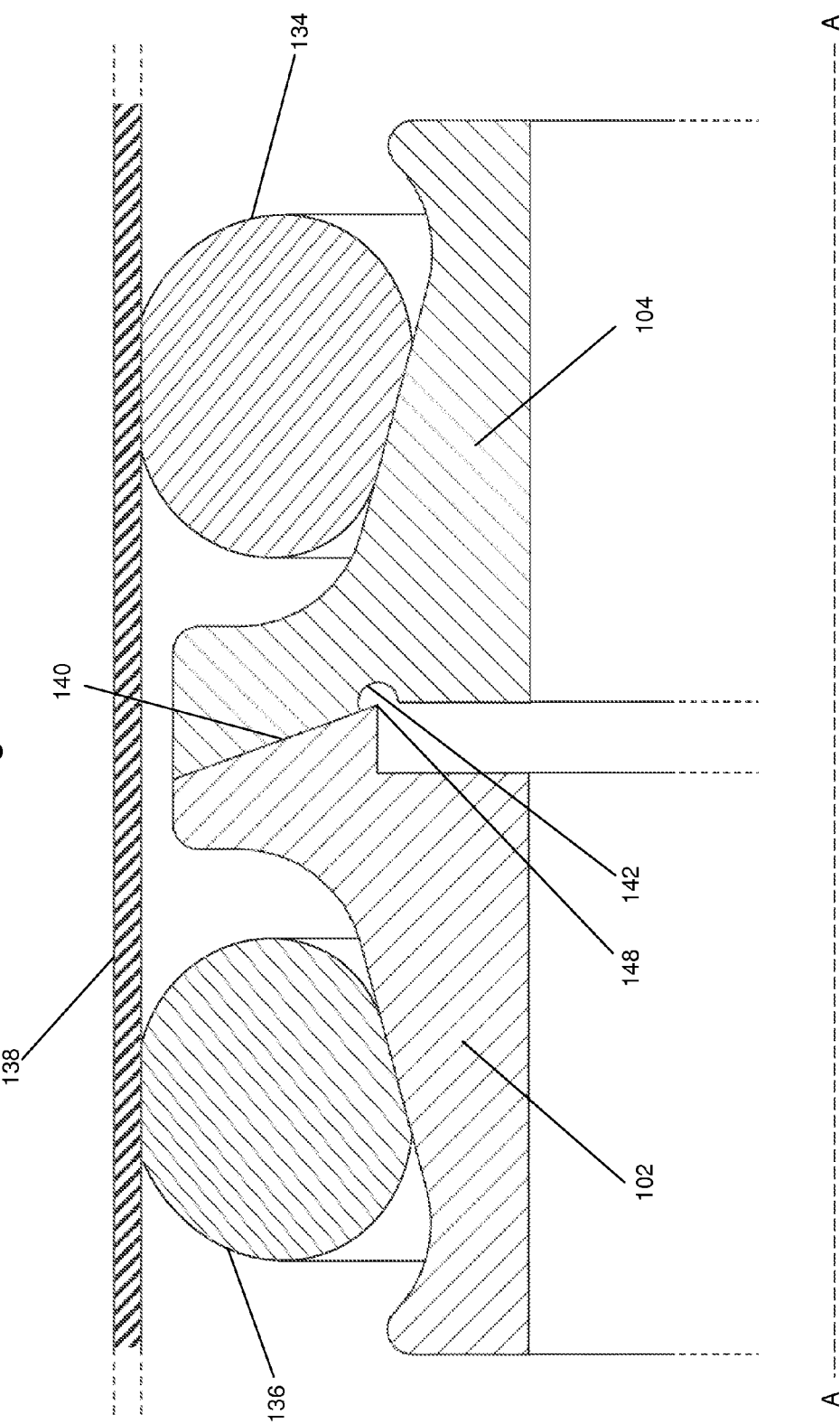
FIG. 4 is a cross-sectional view of the seal assembly of FIG. 1, fitted to a rotatable drive shaft in accordance with an embodiment of the invention.
Figure 5:
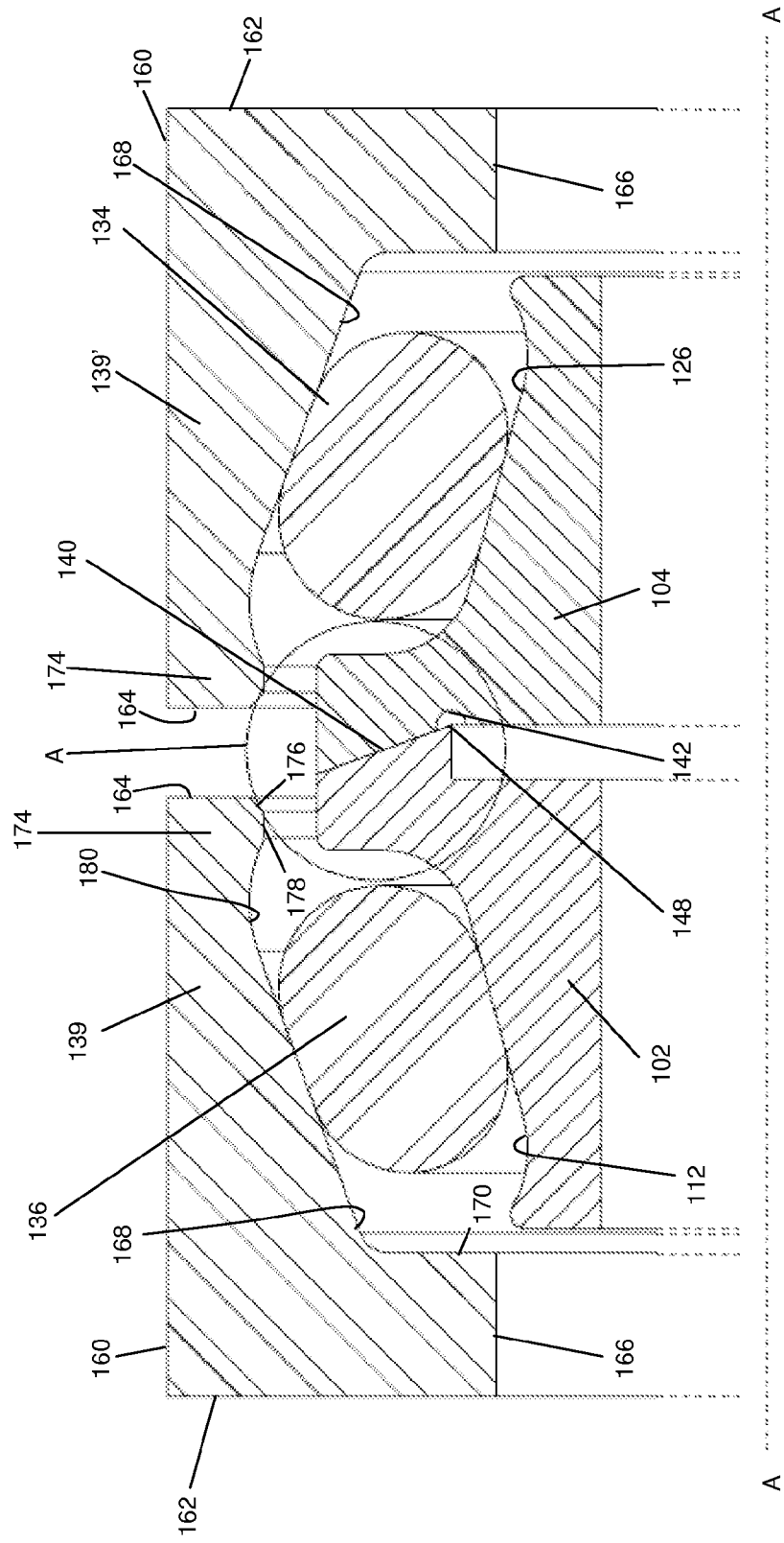
FIG. 5 is a cross-sectional view of a second embodiment of seal assembly in accordance with the present invention.

The inner surface 110 of the tubular body portion 106 is smooth and cylindrical and the outer surface 112 of the tubular body portion is smooth and generally frusto-conical in shape, increasing in diameter towards the annular shoulder 108. A sealing face 114 is disposed on the shoulder 108. The sealing face is inclined with respect to the longitudinal axis, the annular shoulder 108 is therefore slightly frusto-conical in shape. A second annular shoulder 118 also projects radially outwardly from a second end of the tubular body portion 106. The two annular shoulders 108, 118 and the frusto-conical outer surface form a recess 119 for receipt of a deformable O-ring seal 136, as shown in FIGS. 1, 4 and 5, for sealing engagement into a housing 138 in which the assembly 100 is located.

Figure 3:
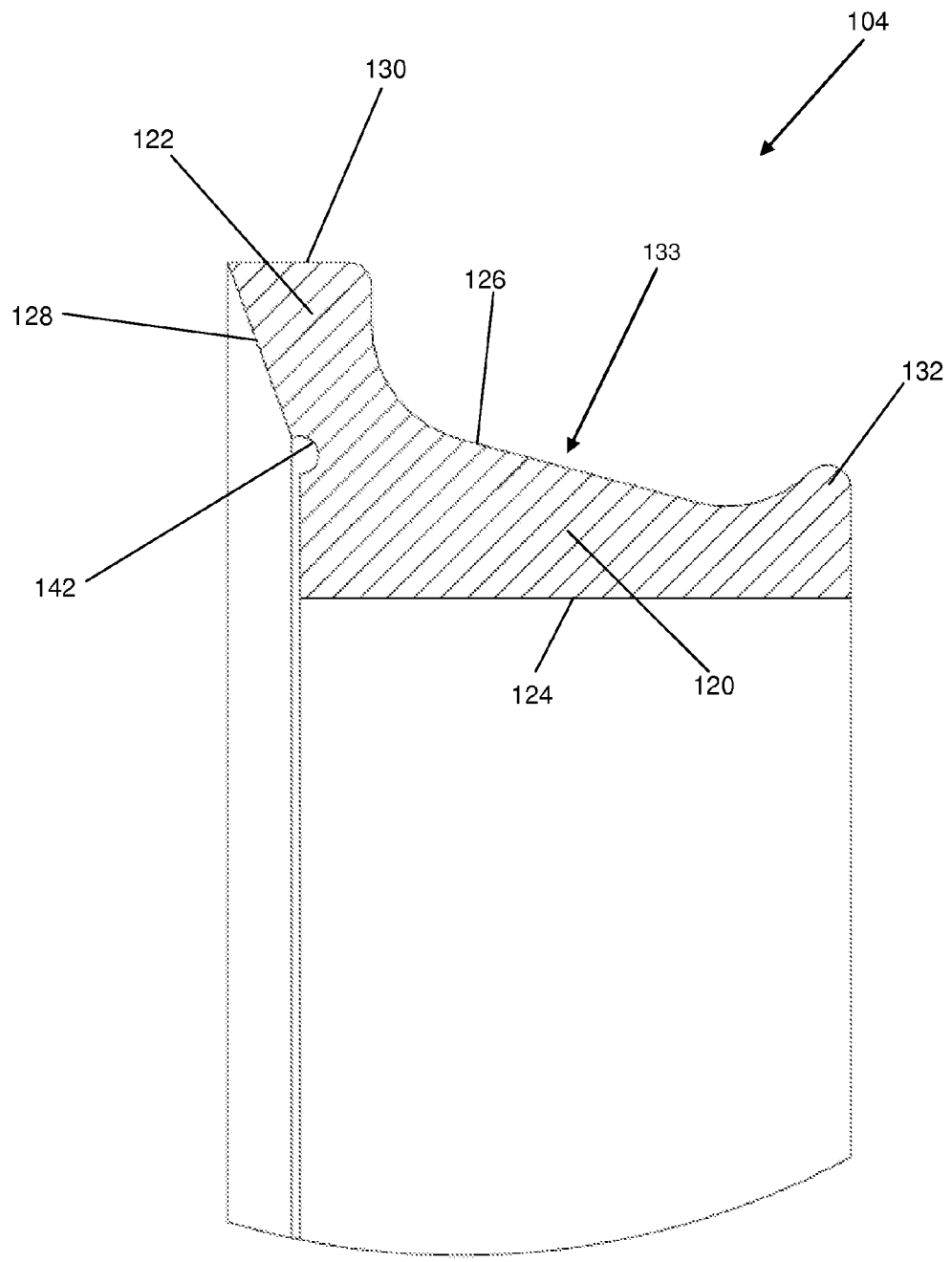
FIG. 3 is a cross-sectional view of a static ring which forms part of the seal assembly of FIG. 1.

The second seal ring 104 as seen in FIG. 3 also has a central tubular body portion 120 and an annular shoulder 122 projecting both axially and radially from a first end of the tubular body portion 120. The inner surface 124 of the body portion 120 is smooth and cylindrical and the outer surface 126 of the tubular portion 120 is smooth and generally frusto-conical in shape, increasing in diameter towards the annular shoulder 122. A sealing face 128, which in use abuts the sealing face 114 of the first sealing ring 102, is disposed on the shoulder 122. The sealing face 128 is inclined at a complementary angle to the inclined sealing face 114 of the first seal ring 102 for sealing abutment with it. A second annular shoulder 132 also projects radially outwardly from a second end of the tubular body portion 120. As for the first sealing ring, the two annular shoulders 122, 132 and the frusto-conical outer surface form a recess 133 for receipt of a deformable O-ring seal, as shown in FIGS. 1, 4 and 5, for sealing engagement with a tubular housing 138 in which the assembly 100 is located.

The O-rings 134 and 136, which in the present context are also referred to as "energisers", consist of a compressible non-metallic elastomeric material having a circular cross-sectional shape as shown. O-rings 134 and 136 might, however, have alternative cross-sectional shapes, such as a D-shape, elliptical shape, triangular shape, trapezoidal shape or a hippopede shape to reduce the risk of the O-rings from dislodging.

Examples of elastomeric material include, but are not limited to: acrylonitrile butadiene (NBR), carboxylated nitrile butadiene (XNBR), hydrogenated acrylonitrile butadiene (HNBR), carboxylated hydrogenated acrylonitrile butadiene (XHNBR), silicone (VMQ), fluorosilicone (FVMQ), fluoroelastomer (FKM, FEPM, TFE/P), perfluoroelastomer (FFKM), chloroprene (CR), ethylene-propylene (EP), ethylene-propylene-diene (EPDM), polyacrylic elastomers (AEM, ACM). The elastomeric material of the first O-ring 134 may be different to that of the second O-ring 136.

FIG. 4 illustrates O-rings 134 and 136 in a compressed state, within the seal assembly positioned in the housing 138. When O-rings 134 and 136 are compressed as shown, they generate an axial face load on their corresponding seal rings 102 and 104, as a result of the frusto-conical surfaces 112, 126 of the first and second seal rings, whereby the sealing faces 114 and 128 are biased towards abutment with each other. The elastomeric O-rings effectively urge the sealing face 114 of the first, dynamic seal ring 102 into juxtaposed engagement with the cooperating sealing face 128 of the second, static seal ring 104. The sealing faces 114 and 128 of the seal rings 102 and 104 bear against each other in the region indicated by the reference numeral 140, providing a rotatable seal intended to prevent the ingress of contaminant material into the internal sealing cavity.

In operation, the sealing faces 114 and 128 of the seal rings 102 and 104 frictionally engage one another as the first, dynamic seal ring 102 rotates, and therefore require a lubricant to reduce friction and cooperate to effect an acceptable duty cycle. The lubrication of the sealing faces 114 and 128 of the seal rings 102 and 104 is enhanced by the provision of an annular groove 142 formed adjacent to the sealing face 128 of the static seal ring 102, which is filled with lubricant.

The annular groove 142 is located close to the sealing faces 114 and 128 so that the lubricant will be delivered by centrifugal force to all portions of the sealing faces 114 and 128. The use of the second, static seal ring 104 embedded with the annular groove 142 provides adequate and efficient distribution of lubricant into the region 140.

As shown in FIG. 4, the cross-sectional length of the first and second sealing faces are different and a lower annular edge 148 of the sealing face 114 of the first, dynamic seal ring 102 projects into the annular groove 142 of the static seal ring 104. As the first, dynamic seal ring 102 rotates, the lower edge 148 of the sealing face 114 agitates the lubricant, promoting the circulation and dynamic transfer of lubricant to the sealing faces 114 and 128. The circulation of lubricant has the benefit of carrying away internally generated debris and external contaminants and also helps to regulate operating temperature and reduce the generation of heat, thereby prolonging the life of the seal assembly 100. In addition, circulation of lubricant also prevents metal seal failure due to scoring from inadequate lubrication flow.

In the embodiment shown, the annular groove 142 is formed with a semi-circular cross-section. However other cross-sectional shapes are possible including, but not limited to, square, rectangular, triangular and trapezoid. The cross-section of the annular groove 142 may be chosen to suit the individual properties of the lubricant.

It will be further understood that satisfactory results can be achieved by incorporating the lubricant and annular groove 142 for retaining the lubricant, in the first, dynamic seal ring 102, rather than the second, static seal ring 104.

Figure 6:
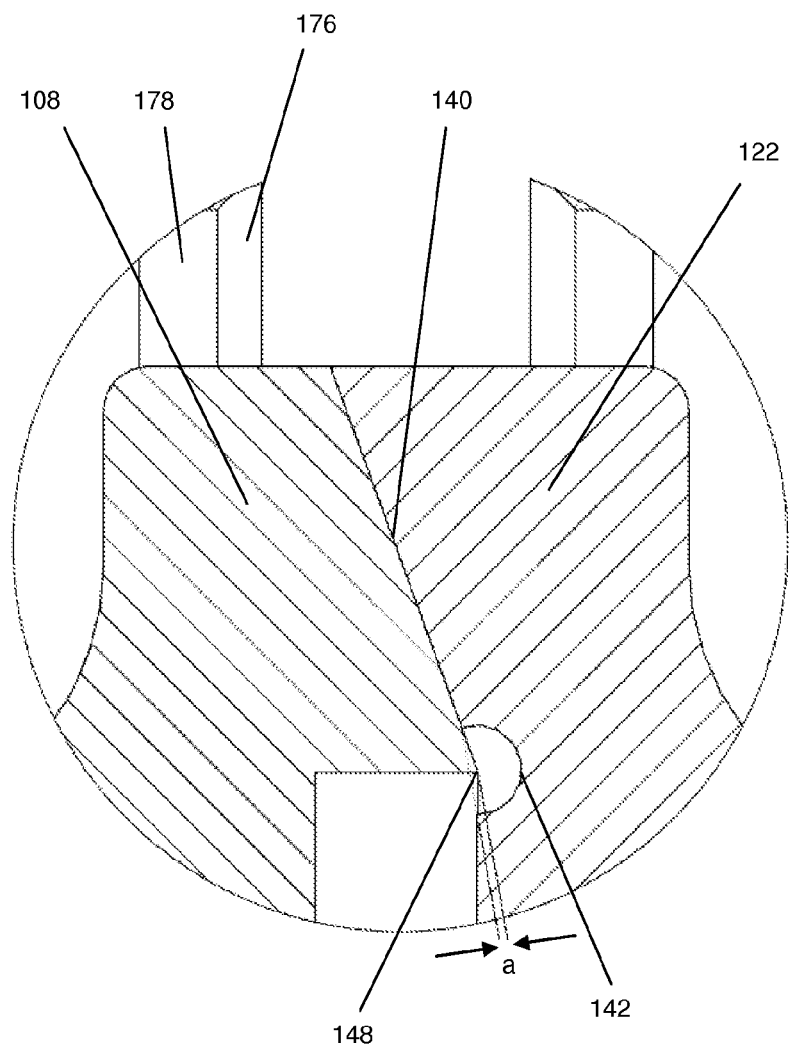
FIG. 6 is an enlarged view of the portion of FIG. 5 identified at "A".

FIGS. 5 and 6 are cross-sectional views of a second embodiment of seal assembly in accordance with the present invention. The embodiment of FIGS. 5 and 6 is very similar indeed to the first embodiment and corresponding features are identified with the same reference numerals. In particular, seal rings 102, 104 and O-rings (or "energisers") 134 and 136 are identical to the corresponding features of the first embodiment.

The only difference from the first embodiment is the replacement of the tubular housing 138 with first and second separate housing components 139, 139', which are associated with seal rings 102 and 104 respectively. Housing components 139, 139' are identical to one another and each comprises a metal annulus having a cylindrical outer face 160, a planar, annular outer end face 162 extending perpendicularly to the longitudinal axis A-A of the seal assembly, a planar, annular inner end face 164 extending radially inwardly from the inner end of the cylindrical outer face 160 and an aperture formed by a cylindrical face 166 extending perpendicularly to the outer end face 162.

The outer end face 162 is significantly wider than the inner face 164, and the radially inner face of each housing component 139, 139' is formed into an inclined face 168 extending between a radially extending face 170 of a longitudinally outer shoulder 172 and a further shoulder 174 formed at the longitudinally inner end of the seal rings 139, 139'. As seen in FIG. 5, the radially inner shoulder comprises an outer flared face 176, contiguous with a cylindrical portion 178 and a curved portion 180, which merges into the inclined face 168.

In the particular embodiment illustrated, the inclined faces 168 are inclined at a slightly greater angle to the longitudinal axis A-A than the inclined faces 112, 126 of the seal rings 102, 104, but they may be inclined at the same angle, or at a smaller angle, if desired.

In use, and as can be seen from FIGS. 5 and 6, the O-rings 136, 134 are compressed between the inclined face 168 and the inclined outer faces 112, 126 of the respective seal ring 102, 104, thereby urging the inclined sealing faces 114, 128 into contact with one another.

As will be apparent, the housing components 139, 139' move with (or remain stationary with) the respective seal rings 102, 104. Other than that, the second embodiment works in a manner identical to that of the first embodiment.

As best seen in FIG. 6, the lower annular edge 148 of the sealing face 114 of the first seal ring 102 projects into the annular groove 142 of the second seal ring 104 by a predetermined distance "a". As for the first embodiment, as the first, dynamic seal ring 102 rotates, the lower edge 148 of the sealing face 114 agitates the lubricant, promoting circulation and dynamic transfer of lubricant to the sealing faces 114 and 128. The circulation of lubricant has the benefit of carrying away internally generated debris and external contaminants and also helps to regulate operating temperature and reduce the generation of heat, thereby prolonging the life of the seal assembly 100. In addition, circulation of lubricant also prevents metal seal failure due to scoring from inadequate lubrication flow.

The second embodiment also allows for a change in the "setting gap" between the opposed faces 164 of the housing component 139, 139' while also ensuring the concentricity of the seal face contact when eccentricity of the housing components 139, 139' occurs in installation or operation.

The composition of the seal rings 102 and 104 may comprise a cast iron alloy or a forged steel. However, the type and grade of metal composition of the seal rings 102 and 104 may be selected based on desired physical properties including, but not limited to, hardness, toughness and wear resistance. Further still, the seal rings 102 and 104 may be manufactured from dissimilar metals. Factors affecting the selection of materials include the ability to bond with coatings, cost and ability to be machined.

Finishing processes of the seal rings 102 and 104 may include grinding and/or lapping and/or turning. These machine processes may be different for different regions of the seal rings 102 and 104.

The seal assembly components may be coated, heat-treated, stress-relieved, carburized, nitrided, annealed or combinations therein. Examples of coatings include diamond, diamond-like coatings, graphite and graphene. This list is not exhaustive. Such coatings may not be applied evenly to the seal assembly components, allowing some regions to be softer, harder, better wearing or to prevent fracture.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For example, other energising elements may be used in place of O-rings (energisers), such as Belleville washers. Moreover, although the lower edge 148 of the sealing face has been described and illustrated as projecting into the groove 142, the edge may be located adjacent to, but not in, the groove 142. Other aspects, features and advantages will be apparent upon an examination of the attached drawings and appended claims.

What is claimed is:

1. A seal assembly comprising:
a first ring and a second ring which are rotatable relative to each other about a longitudinal axis;
a first annular seal surface formed on the first ring, said first annular seal surface being a radial surface inclined with respect to the longitudinal axis;
a second annular seal surface formed on the second ring, said second annular seal surface being a radial surface having a same incline with respect to the longitudinal axis and arranged to abut the radial surface of said first annular seal surface to form a seal; and
an annular groove formed in at least a first one of said first and second seal rings adjacent to the annular seal surface on said seal ring.

2. The seal assembly as claimed in claim 1, wherein one or both of the first and second rings comprises a seal-receiving recess on an outer surface.

3. The seal assembly as claimed in claim 2, comprising a seal in said seal-receiving recess.

4. The seal assembly as claimed in claim 3, wherein the seal is resiliently deformable.

5. The seal assembly as claimed in claim 1, wherein at least one of said first and second ring includes at least one radially outwardly extending annular shoulder formed on the outer surface.

6. The seal assembly as claimed in claim 1, wherein the seal biases at least one of said first and second ring in a direction towards each other into sealing abutment with the annular sealing surface on the first and second ring.

7. The seal assembly as claimed in claim 1, wherein an outer surface of at least one of the first and second ring comprises a frusto-conical portion.

8. The seal assembly as claimed in claim 1, wherein an inner surface of at least one of the first and second ring comprises a cylindrical portion.

9. The seal assembly as claimed in claim 1, wherein said annular groove has a cylindrical cross-section.

10. The seal assembly as claimed in claim 1, wherein at least one of the first and second ring comprises a plurality of annular grooves.

11. The seal assembly as claimed in claim 1, wherein a lubricant is disposed in said groove to provide lubrication between said first annular seal surface and said second annular seal surface.

12. The seal assembly as claimed in claim 1, comprising a projection on a second one of said first and second seal rings, which projects into, or to a location adjacent to, said annular groove.

13. The seal assembly as claimed in claim 1, wherein a cross-sectional length of the first and second annular seal surfaces are different.

* * * * *